(12) United States Patent
Wickstrom

(10) Patent No.: US 8,931,423 B2
(45) Date of Patent: Jan. 13, 2015

(54) SOIL OPENER

(71) Applicant: VW Manufacturing Inc., Dunmore (CA)

(72) Inventor: Vic Wickstrom, Dunmore (CA)

(73) Assignee: VW Manufacturing Inc., Dunmore, Alberta (CA)

( * ) Notice: Subject to any disclaimer, the term of this patent is extended or adjusted under 35 U.S.C. 154(b) by 0 days.

(21) Appl. No.: 13/912,804

(22) Filed: Jun. 7, 2013

(65) Prior Publication Data

US 2014/0053763 A1 Feb. 27, 2014

(51) Int. Cl.
*A01C 7/06* (2006.01)
*A01B 49/06* (2006.01)

(52) U.S. Cl.
CPC ...................................... *A01B 49/06* (2013.01)
USPC ........... 111/124; 111/125; 111/129; 111/174; 111/187; 111/188

(58) Field of Classification Search
CPC ........................................................ A01B 49/06
USPC ......... 111/186–188, 170, 174–176, 118–129, 111/7.1–7.4
See application file for complete search history.

(56) References Cited

U.S. PATENT DOCUMENTS

2008/0257239 A1* 10/2008 Noh et al. ..................... 111/186

* cited by examiner

*Primary Examiner* — Christopher J Novosad
(74) *Attorney, Agent, or Firm* — Bennett Jones LLP

(57) ABSTRACT

A soil opener comprises a tip attached to or integral with a body. The tip includes furrowing prow for cutting a furrow in the soil surface, a protrusion on the underside of the tip for cutting a trench within the furrow, and a seed distributor for depositing seeds within the furrow in laterally displaced seed rows. The body includes a seed passage for directing a seed stream to the seed distributor, a primary fertilizer passage for depositing a primary fertilizer stream, and a secondary fertilizer passage for depositing a secondary fertilizer. As the soil opener is moved across the soil surface, the body opener deposits primary fertilizer in the vicinity of the seed rows, and secondary fertilizer between the seed rows in a trench slightly below the surface of the seeds.

8 Claims, 5 Drawing Sheets

SOIL OPENER

CROSS REFERENCE TO RELATED APPLICATIONS

This application claims the priority benefit of Canadian Patent Application 2,787,872 filed on Aug. 24, 2012 entitled "Soil Opener", the contents of which are incorporated herein by reference.

FIELD OF THE INVENTION

The present invention relates to an air seeding soil opener, and more particularly a soil opener capable of depositing multiple rows of seeds and different types of fertilizers at different locations relative to the seeds.

BACKGROUND OF THE INVENTION

The efficacy of crop fertilizers depends on their placement relative to the crop seed because the nutrient requirements of crops change over the crop life cycle. During their sprouting and early growth stages, crops take in a significant amount of phosphorus which promotes rapid growth and early maturity. Accordingly, phosphorus-rich fertilizer (typically available in liquid form) should be placed in the immediate vicinity of the seeds, where it can be absorbed by the nascent root systems. During their early growth stages until their maturity, crops take in nitrogen which stimulates stem and leaf development. Accordingly, nitrogen-rich fertilizer (typically available either in liquid or granular form) should be placed in a zone below and surrounding the seeds, where it can be accessed by the root systems as they develop downwards and outwards from the seeds. Moreover, mixing of phosphorus-rich fertilizer and nitrogen-rich fertilizer in the soil should be avoided because such mixing can have toxicity effects known as "seed burn".

Air seeders are commonly used in modern farming practice to simultaneously place granular crop seeds (e.g., cereal grain seeds) and fertilizer below the soil surface. In general, an air seeder comprises a mobile frame supporting a seed hopper, a fertilizer hopper, a seed metering system, a fertilizer metering system, a seed manifold, a fertilizer manifold, a pneumatic seed delivery system, a fertilizer delivery system, and a plurality of soil openers each of which has at least one seed passage and one fertilizer passage. A tractor tows the mobile frame across the soil surface causing the soil openers to cut furrows into the soil surface. Simultaneously, the seed metering system feeds a seed stream from the seed hopper into the seed manifold. The pneumatic seed delivery system creates an airstream that evenly distributes the seeds stream to the seed passages, which deposit the seeds in the furrows. The fertilizer metering system, fertilizer hopper, fertilizer delivery system and fertilizer passages function in an analogous manner with respect to the fertilizer, although the fertilizer delivery system may be adapted to deliver liquid or gaseous fertilizers.

In the prior art, "double-shoot" soil openers are designed to deposit crop seeds in paired rows with a band of fertilizer placed in between and slightly below the level of the seed rows. Such soil openers have a seed distributor that divides the seed stream into two portions that are deposited in laterally spaced apart rows. A small protrusion on the underside of the soil opener cuts a small trench in between the two seed rows and slightly deeper than the furrow. The fertilizer passage is positioned to deposit the fertilizer into the trench. However, use of such soil openers to deposit a mixture of phosphorus-rich and nitrogen-rich fertilizers will result in suboptimal placement of the phosphorus-rich fertilizer away from the seeds and mixing of the fertilizers that will increase the risk of seed burn.

SUMMARY OF THE INVENTION

In one aspect, the invention provides a soil opener configured to receive a seed stream and a primary fertilizer stream and moved across a soil surface in a forward longitudinal path, said opener comprising:

(a) a tip comprising:
 (i) a furrowing prow for cutting a furrow into the soil surface as the opener is moved in the path;
 (ii) a seed distributor for dividing the seed stream into at least two seed portions and depositing said seed portions in the furrow, rearward of the furrowing prow, in at least two laterally displaced seed rows; and
 (iii) a trenching means for cutting a trench within the furrow in a position laterally between the at least two seed rows;

(b) a body attached to or integral with the tip, said body comprising:
 (i) a seed passage defining a seed inlet for receiving the seed stream and a seed outlet positioned and oriented for directing the seed stream to the seed distributor;
 (ii) at least two primary fertilizer passages, each of which defines a primary fertilizer inlet for receiving part of the primary fertilizer stream, and a primary fertilizer outlet disposed and oriented for depositing that part of primary fertilizer stream in the furrow, rearward of the furrowing prow, in a position laterally coinciding with any one seed row; and
 (iii) a secondary fertilizer passage defining a secondary fertilizer inlet for receiving a secondary fertilizer stream, and a secondary fertilizer outlet disposed and oriented for depositing the secondary fertilizer stream in or near the trench.

In one embodiment, the soil opener is further configured to receive a secondary fertilizer stream, wherein the tip further comprises a trenching means for cutting a trench within the furrow in a position laterally between the seed rows; and the body further comprises a secondary fertilizer passage defining a secondary fertilizer inlet for receiving the secondary fertilizer stream, and a secondary fertilizer outlet disposed and oriented for depositing the secondary fertilizer stream in the furrow, rearward of the furrowing prow, in a position laterally coinciding with the trench.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF EMBODIMENTS OF THE INVENTION

Figure 1:
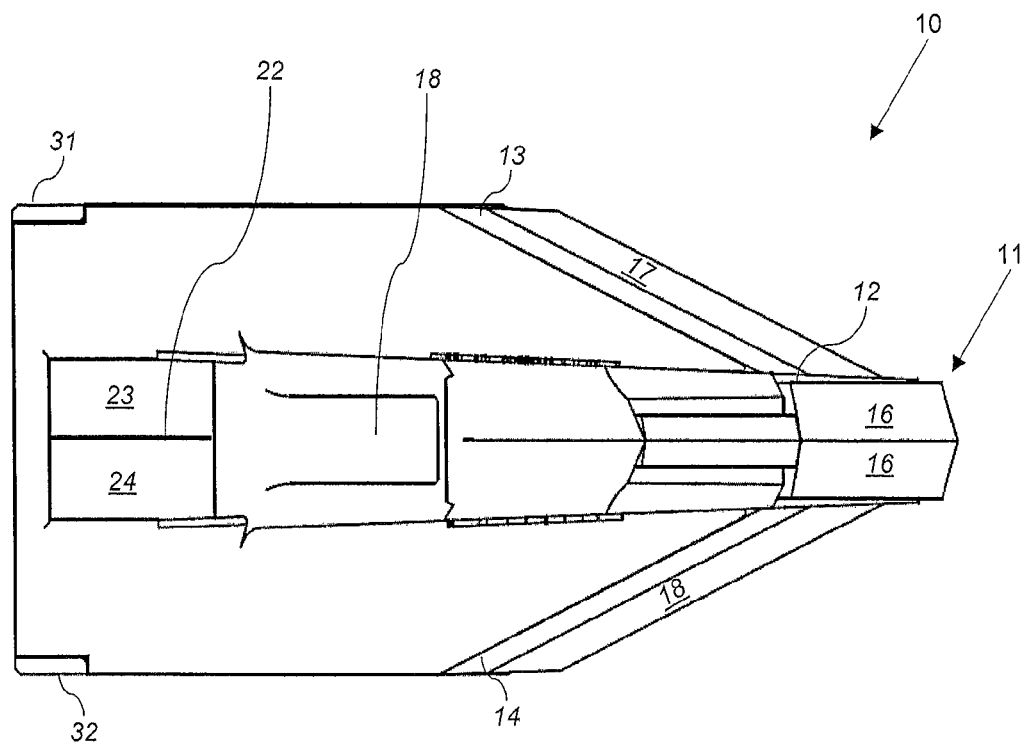
FIG. 1 is a top plan view of an embodiment of a furrowing tip of the present invention.
Figure 2:
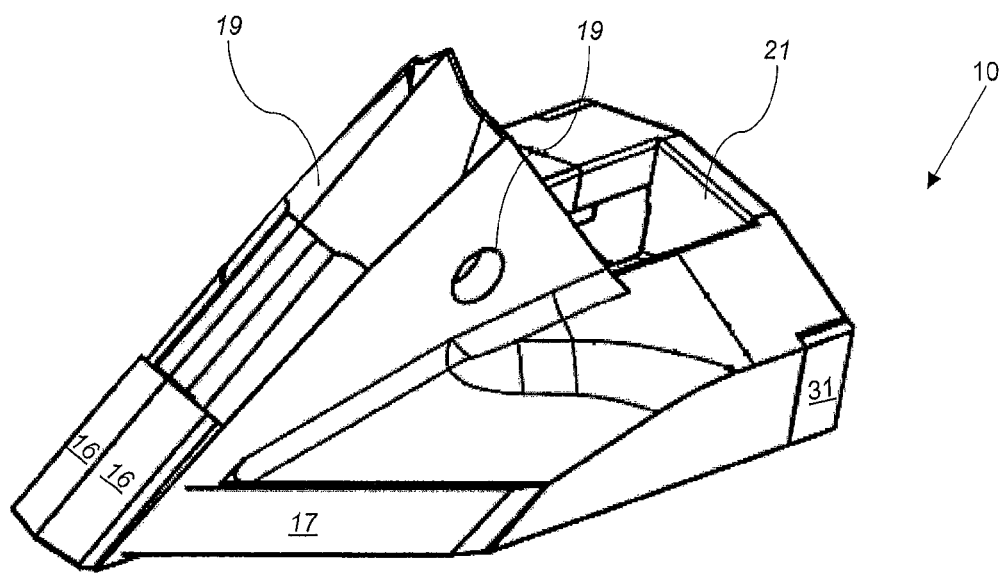
FIG. 2 is a front-left perspective view of an embodiment of a furrowing tip of the present invention.
Figure 3:
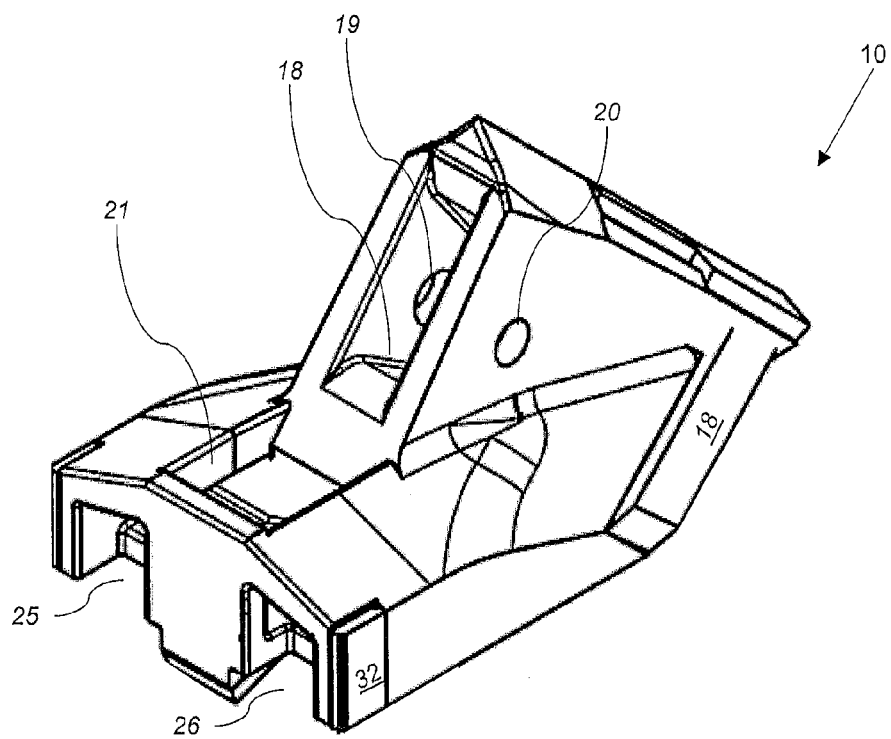
FIG. 3 is a rear-right perspective view of an embodiment of a furrowing tip of the present invention.
Figure 4:
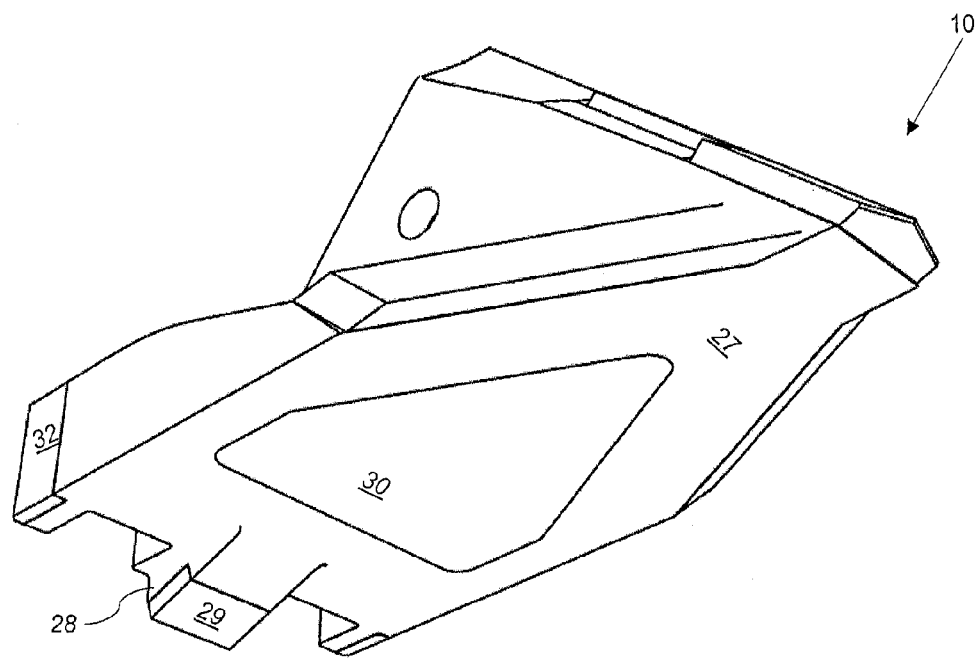
FIG. 4 is a bottom-right perspective view of an embodiment of a furrowing tip of the present invention.

The present invention relates to a soil opener. When describing the present invention, all terms not defined herein have their common art-recognized meanings.

In general, the soil opener (200) comprises a tip (10) and a body (40). The tip (10) and the body (40) may be constructed from any durable material such as steel. The soil opener (200) is to be moved in a forward longitudinal path across a soil surface.

In one embodiment, the tip (10) has a furrowing prow (11) to cut into and displace the soil surface to create a furrow as the soil opener is towed in the path. In one embodiment, the furrowing prow comprises a centrally located knife edge (12) with a pair of blades (13, 14) projecting rearward and outwardly in opposing lateral directions. Wear-resistant metal carbide plates (16 and 17) may be welded to the working surfaces of the knife edge (12) and the blades (13, 14) to protect them against damage and abrasion by the soil.

In one embodiment, the tip (10) has a body mount so that the tip (10) can be selectively attached to and detached from the body (40). The body mount comprises a socket (18) for receiving the body (40) and defining apertures (19, 20) for receiving therethrough a fastener such as a locking pin or threaded connector. In other embodiments, not shown, the tip (10) may be integrally constructed with the body (40).

The tip (10) has a seed distributor for dividing a seed stream into a plurality of seed portions and depositing each of the seed positions in the furrow, rearward of the furrowing prow- and laterally displaced from one another. In one embodiment, the seed distributor comprises a cavity (21) for receiving a seed stream, and a pair of surfaces (23, 24) downwardly inclined in the lateral direction from a common central ridge (22) for dividing the seed stream into two seed portions. The surfaces (23, 24) lead to respective seed channels (25, 26) which are laterally displaced from each other and open to the soil surface.

The tip (10) has a trenching means for cutting a small trench in the furrow for receiving the secondary fertilizer. In one embodiment, the trenching means comprises a small protrusion (28) on the underside (27) of the tip (10), approximately half way between the seed channels (25, 26) in the lateral direction. A wear-resistant metal carbide plate (29) may be welded to the working surface of the protrusion (28) to protect the protrusion (28) against damage by the soil.

In an embodiment, the underside (27) of the tip (10) defines a recess (30) which decreases the surface area of the tip (10) in contact with the soil surface and hence reduces the frictional resistance to towing the tip across the soil surface. The tip (10) may also be provided with metal carbide plates (31, 32) to protect the trailing edges on the lateral faces of the tip (10) against damage by the soil.

Figure 5:
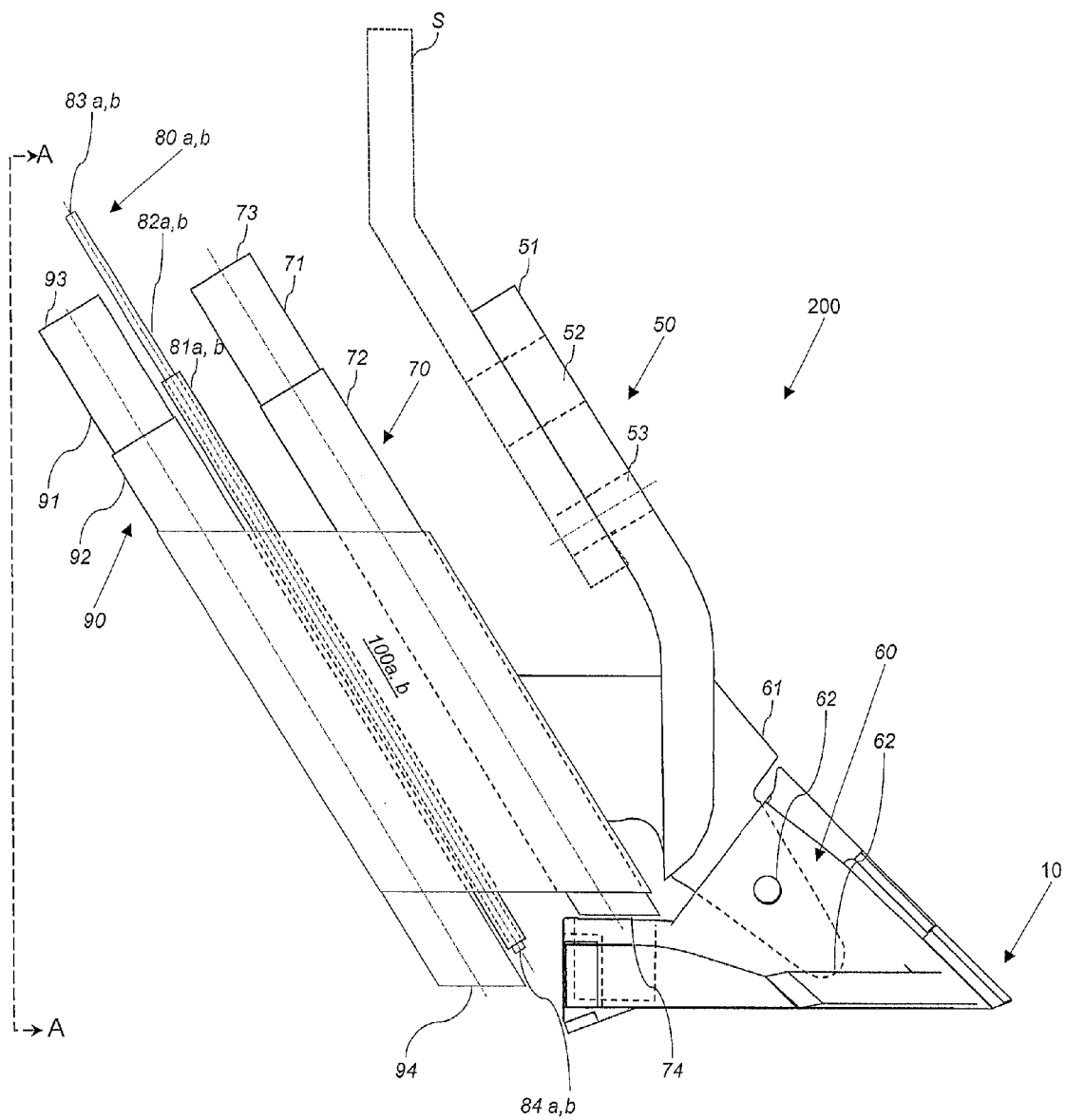
FIG. 5 is a right elevation view of an embodiment of the soil opener of the present invention.
Figure 6:
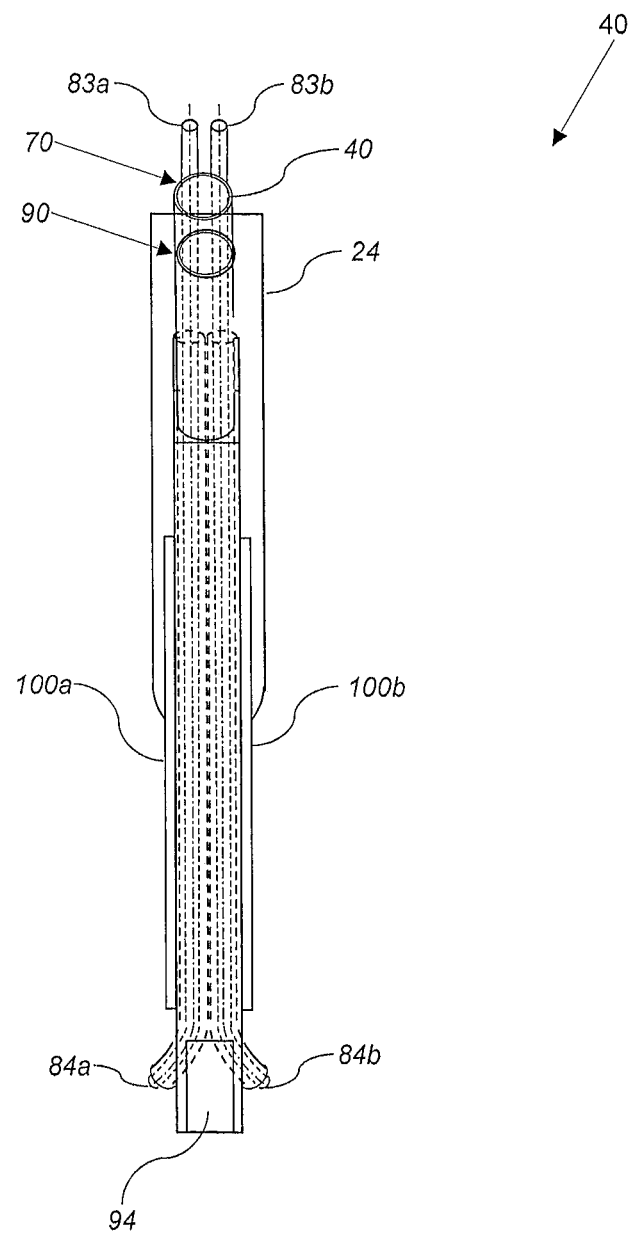
FIG. 6 is a rear elevation view of an embodiment of the soil opener body of the present invention, as viewed along line A-A of FIG. 5.

As shown in FIGS. 5 and 6, the body (40) has an implement mount (50) constructed of a steel plate (51) for mating with an implement shank (S). The steel plate (51) defines apertures (52) and (53) which align with apertures defined by the implement shank (S) for receiving therethrough a fastener such as a locking pin or threaded connector. As the implement shank (S) may vary in dimension and configuration from manufacturer to manufacturer, the implement mount (50) may be custom designed to fit to implements by specific manufacturers.

The body (40) has a tip mount (60), which may be constructed of a steel plate (61) with a tapered end (62) for insertion into the socket (18) of the tip (10). The tip mount (60) also defines an aperture (62) which, when the tapered end (62) is inserted in the socket (18), aligns with the apertures (19, 20), for receiving for receiving therethrough a fastener such as a locking pin or threaded connector. In other embodiments, not shown, the tip (10) may be integrally constructed with the body (40).

In one embodiment, the body (40) has a seed passage (70) comprising two tubes (71, 72) welded end to end. The top tube (71) has a circular cross section to facilitate connection to tubing conveying a seed stream from a seed hopper. The bottom tube (72) has a square cross section to facilitate welding the seed passage (70) to the tip mount (60) and side plates (100a, 100b). The top of the seed passage (70) defines a seed inlet (73) for receiving a seed stream, while the bottom of the seed passage defines a seed outlet (74). When the tip (10) is attached to the body (40), the seed outlet (74) is aligned with the cavity (21) of the seed distributor of the tip (10).

The body (40) has two primary fertilizer passages (80a, 80b) comprising tubes (81a, 81b), which are welded to the secondary fertilizer passage (90). To prevent corrosion when used with a corrosive primary fertilizer, the tubes (81a, 81b) may be made of a corrosion resistant alloy such as stainless steel, or plastic tubes (82a, 82b) may be inserted therein. The top of each primary fertilizer tube (80a, 80b) defines a primary fertilizer inlet (83a, 83b) for receiving a primary fertilizer stream, while the bottom of each primary fertilizer tube (80a, 80b) defines a primary fertilizer outlet (84a, 84b) exposed to the soil surface. As depicted in FIG. 6, the primary fertilizer outlets (84a, 84b) are curved outwards in opposing lateral directions. When the tip (10) is attached to the body (40), the primary fertilizer outlets (84a, 84b) are in approximate lateral and vertical alignment with the seed channels (25, 26) of the tip (10).

The body (40) has a secondary fertilizer passage (90) comprising two tubes (91, 92) welded end to end. The top tube (91) has a circular cross section to facilitate connection to tubing conveying a secondary fertilizer stream from a secondary fertilizer hopper. The bottom tube has a square cross section to facilitate welding the secondary fertilizer passage (90) to the primary fertilizer tubes (80a, 80b) and to the side plates (100a, 100b). The top of the secondary fertilizer passage (90) defines a secondary fertilizer inlet (93) for receiving a secondary fertilizer stream, while the bottom of the seed passage defines a secondary fertilizer outlet (94) exposed to the soil surface. When the tip (10) is attached to the body (40), the secondary fertilizer outlet (94) is in approximate lateral alignment with the protrusion (28) on the underside (27) of the tip (10), and is preferably lower than the primary fertilizer outlets (84a, 84b).

The operation of the soil opener (200) is now described. The soil opener (200) is mounted to an implement shank (S) of a mobile frame supporting air seeding equipment. The seed inlet (73) is connected to a pneumatic seed delivery system feeding a seed stream from a seed hopper. The primary fertilizer inlets (83a, 83b) are connected to a primary fertilizer delivery system feeding a primary fertilizer stream from a primary fertilizer hopper. As an example, the primary fertilizer may be a phosphorus-rich fertilizer such as liquid ammonium polyphosphate. The secondary fertilizer inlet (93) is connected to a secondary fertilizer delivery system feeding a secondary fertilizer stream from a secondary fertilizer hopper. As an example, the secondary fertilizer may be a nitrogen-rich fertilizer such as solid granular urea or ammonium sulphate, or gaseous anhydrous ammonia.

The mobile frame is towed by a tractor causing the soil opener (200) to move in a path across the soil surface. As it does so, the furrowing prow (11) cuts a furrow into the soil surface, while the protrusion (28) on the underside (27) of the tip (10) cuts a small trench near the midline of the furrow.

As the soil opener is moved over the soil surface, the seed outlet (74) of the seed passage (70) delivers the seed stream to the cavity (21). Therein, the central ridge (22) and inclined surfaces (23, 24) divides the seed stream into two approximately equal seed portions. One seed portion exits the tip (10) through one seed channel (25) while the other seed portion exits the tip (10) through the second seed channel (26), thereby depositing in the furrow, longitudinally rearward of the furrowing prow, two laterally displaced rows of seeds.

As the soil opener is moved over the soil surface, the primary fertilizer outlets (84*a*, 84*b*) of the primary fertilizer passages (80*a*, 80*b*) deposit the primary fertilizer streams in the furrow, longitudinally rearward of the furrowing prow. By virtue of the lateral and vertical alignment of the primary fertilizer outlets (84*a*, 84*b*) with the seed channels (25, 26), the primary fertilizer is deposited in lateral locations substantially coinciding with the deposited seeds.

As the soil opener is moved over the soil surface, the secondary fertilizer outlet (94) of the secondary fertilizer passage (90) deposits the secondary fertilizer stream in the furrow, longitudinally rearward of the furrowing prow. By virtue of the lateral alignment of the secondary fertilizer outlet (94) with the protrusion (28) on the underside (27) of the tip (10), the secondary fertilizer is deposited in a lateral location coinciding with the trench.

As the soil opener is moved over the soil surface, some of the displaced soil behind the trailing edge of the tip (10) will fall back into the furrow, thereby covering the deposited seeds, primary fertilizer and secondary fertilizer.

Figure 7:
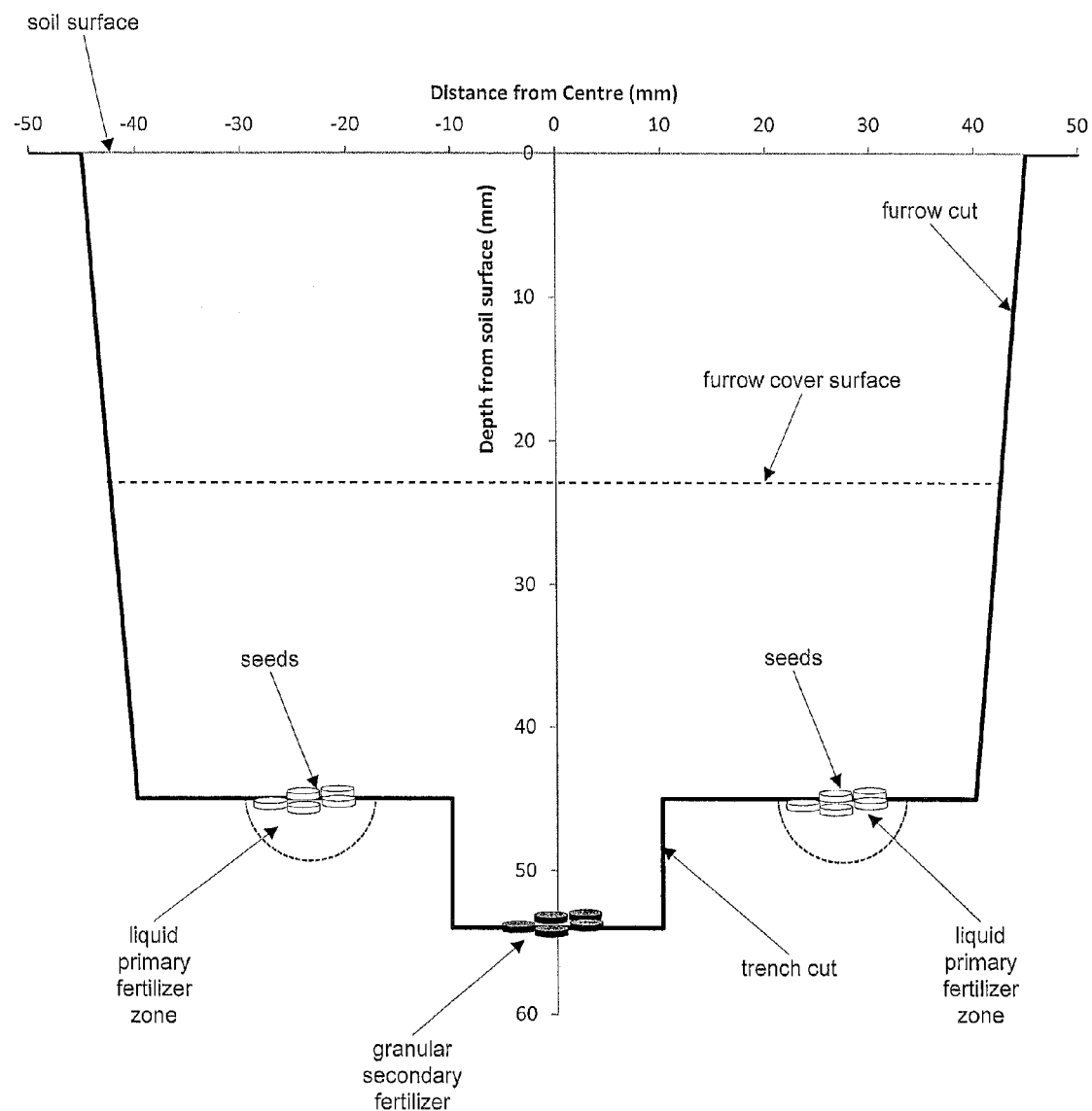
FIG. 7 is an elevation view of a representation of the positions of seeds, primary fertilizer and secondary fertilizer as deposited by an embodiment of the soil opener of the present invention.

As an example, FIG. 7 depicts the resulting distribution of deposited seeds, primary liquid fertilizer and secondary granular solid fertilizer within the furrow, as well as the furrow cover surface. The placement of the primary fertilizer allows it to be absorbed by the nascent root systems in the immediate vicinity of the seeds, while the placement of the secondary fertilizer allows it to be subsequently absorbed by more developed root systems. The physical segregation of the primary fertilizer and the secondary fertilizer also decreases the risk of seed burn. As will be apparent to those skilled in the art, the dimensions of the furrow, the trench, and the exact placement of the seeds, primary fertilizer, and secondary fertilizer can be selected by appropriate dimensioning of the tip (10).

To the extent that the foregoing description is of a specific embodiment or a particular use of the invention, it is intended to be illustrative only, and not limiting of the claimed invention. The foregoing description is intended to cover all alternatives, modifications and equivalents that are included in the scope of the invention, as defined in the appended claims.

The invention claimed is:

1. A soil opener configured to receive a seed stream, a primary fertilizer stream, and a secondary fertilizer stream, wherein said soil opener is moved across a soil surface in a forward longitudinal path, said soil opener comprising:
    (a) a tip comprising:
        (i) a furrowing prow for cutting a furrow into the soil surface as the soil opener is moved in the forward longitudinal path;
        (ii) a seed distributor for dividing the seed stream into at least two seed portions and depositing said at least two seed portions in the furrow, rearward of the furrowing prow, in at least two laterally displaced seed rows; and
        (iii) a trenching means for cutting a trench within the furrow in a position laterally between the at least two seed rows;
    (b) a body attached to or integral with the tip, said body comprising:
        (i) a seed passage defining a seed inlet for receiving the seed stream and a seed outlet positioned and oriented for directing the seed stream to the seed distributor;
        (ii) at least two primary fertilizer passages, each of which defines a primary fertilizer inlet for receiving part of the primary fertilizer stream, and a primary fertilizer outlet disposed and oriented for depositing that part of primary fertilizer stream in the furrow, rearward of the furrowing prow, in a position laterally coinciding with any one seed row; and
        (iii) a secondary fertilizer passage defining a secondary fertilizer inlet for receiving the secondary fertilizer stream, and a secondary fertilizer outlet disposed and oriented for depositing the secondary fertilizer stream in a position laterally coinciding with the trench.

2. The soil opener of claim 1 wherein the secondary fertilizer outlet is positioned lower than the primary fertilizer outlets.

3. The soil opener of claim 1 wherein each primary fertilizer outlet is disposed and oriented for depositing that part of the primary fertilizer stream in a position uniquely laterally coinciding with one of the seed rows.

4. The soil opener of claim 1 wherein the seed distributor divides the seed stream into two portions and the body has two primary fertilizer passages.

5. The soil opener of claim 1 wherein the furrowing prow, the seed distributor, and the trenching means are formed as a monolithic unit.

6. The soil opener of claim 5 wherein the tip defines a socket, and the body further comprises a tip mount insertable in the socket for attaching the tip to the body.

7. The soil opener of claim 1 wherein the seed distributor comprises a pair of surfaces vertically inclined in the lateral direction away from a central ridge.

8. The soil opener of claim 7 wherein the pair of surfaces are recessed in a cavity formed in the tip.

* * * * *